United States Patent [19]
Montefusco et al.

[11] 3,887,775
[45] June 3, 1975

[54] SYSTEM FOR MEASURING GROUP DELAY IN SIGNAL TRANSMISSION

[75] Inventors: Nicola Montefusco; Alfredo Barlucchi, both of Milan, Italy

[73] Assignee: Societa Italiana Telecomunicazioni Siemens S.p.A., Milan, Italy

[22] Filed: Oct. 31, 1973

[21] Appl. No.: 411,237

[30] Foreign Application Priority Data
Oct. 31, 1972 Italy................................. 31144/72

[52] U.S. Cl...................... 179/175.3 R; 324/57 DE
[51] Int. Cl. ........................................... H04b 3/46
[58] Field of Search...... 179/175.3 R; 333/18, 28 R; 324/57 DE

[56] References Cited
UNITED STATES PATENTS

| | | | |
|---|---|---|---|
| 2,337,541 | 12/1943 | Burgess............................ | 179/175.3 |
| 2,929,987 | 3/1960 | Noland ............................ | 179/175.3 |
| 3,629,696 | 12/1971 | Bartelink ........................ | 179/175.3 |

OTHER PUBLICATIONS
IBM Technical Disclosure Bulletin; Vol. 14, No. 3; August, 1971; "Measuring Group Delay" by A. A. Couder.

*Primary Examiner*—David L. Stewart
*Attorney, Agent, or Firm*—Karl F. Ross; Herbert Dubno

[57] ABSTRACT
To measure the phase shift experienced by a selected carrier frequency (measuring frequency $f_M$) relative to a standard carrier frequency (reference frequency $f_R$) on passing through a test object such as a four-terminal network, the two carriers are alternately transmitted through that test object under the control of a switching signal (commutation frequency $f_c$) while being amplitude-modulated by a common modulating frequency $f_m$. At the receiving end, the detected carrier envelope of the incoming test wave is fed in parallel to an attenuation detector MA with an input filter $F_2$ selecting the commutation frequency $f_c$, a phase discriminator MR with an input filter $F_3$ selecting the modulating frequency $f_m$, and a synchronizing circuit SR with an input filter $F_4$ suppressing the modulating frequency $f_m$ in cascade with another filter $F_9$ passing a higher characteristic frequency $f_r$ which is supermodulated upon the reference frequency in the final cycle of modulating frequency $f_m$ just before the switchover. The phase discriminator MR comprises a zero-crossing detector ZCD delivering a measuring square wave $x$ of mean frequency $f_m$ to a phase comparator RF which is part of a phase-locking loop including a voltage-responsive local oscillator VCX; the latter, through a frequency divider, supplies the comparator with a reference square wave of like frequency. The phase difference of the two square waves is measured by the amplitude of a sine wave of frequency $f_m$ derived from two pulse trains $a$, $r$ in the comparator output. The rectified but undemodulated carrier frequencies of the test wave are delivered to an analog frequency indicator PX and to a digital frequency discriminator MF.

22 Claims, 11 Drawing Figures

«3,887,775»

SYSTEM FOR MEASURING GROUP DELAY IN SIGNAL TRANSMISSION

1. FIELD OF THE INVENTION

Our present invention relates to a system for measuring the group delay in the transmission of high-frequency signals through a four-terminal network, communication channel or other test object, e.g. for the purpose of assisting in the design or control of an equalizer.

2. BACKGROUND OF THE INVENTION

According to the well-known Nyquist & Brand method, the group delay is ascertained by alternately passing two carrier frequencies through the test object, i.e. a standard carrier frequency (referred to hereinafter as reference frequency $f_R$) and a selected carrier frequency representative of the band for which the group delay is to be determined (referred to hereinafter as measuring frequency $f_M$). The switchover between the two carriers occurs periodically at a commutation frequency $f_c$ under the control of a suitable switching signal. The two carriers are amplitude-modulated with a common modulating frequency $f_m$ which advantageously is a multiple of the commutation frequency $f_c$. In passing through the test object, the two carriers experience different phase shifts (as well as different degress of attenuation) so that, upon demodulation at the receiving end, a distinct phase jump occurs in the detected carrier envelope. The extent of this phase jump is a measure of the relative phase shift of the two carriers and, if the group delay at the level of the reference frequency is known, is also representative of the absolute group delay in the band of interest.

3. OBJECTS OF THE INVENTION

The general object of our present invention is to provide an efficient group-delay-measuring system of this character which is highly reliable in operation and of relatively simple design.

Another object is to provide means in such a system for measuring not only the phase shift but also further parameters of a composite test wave received, such as relative attenuation and absolute carrier frequencies.

4. SUMMARY OF THE INVENTION

In accordance with the present invention, we provide a receiver for this composite test wave including an amplitude demodulator for detecting the carrier envelope which consists essentially of the modulating frequency $f_m$ undergoing two opposite phase shifts during a switching cycle $1/f_c$; advantageously, this frequency $f_m$ is in turn modulated during a small portion of a switching cycle, preferably immediately before the end of the first half of this cycle serving for the transmission of reference frequency $f_R$, with a characteristic frequency $f_r >> f_m$ for the purpose of synchronization as more fully described hereinafter. A phase discriminator connected to the output of the amplitude demodulator includes circuitry for converting the detected carrier envelope into a measuring square wave in phase with that envelope, such as a zero-crossing detector which causes the reversal of a flip-flop at the end of every half-cycle of modulating frequency $f_m$. A phase comparator in the discriminator, forming part of a phase-locking loop, produces a control signal for a tunable oscillation generator whose output is converted into a reference square wave of the same frequency $f_m$ by a wave-shaping circuit included in the loop, this reference square wave being fed together with the measuring square wave to respective inputs of the comparator which tends to stabilize the phase of the reference square wave at the mean phase of the measuring square wave. The phase comparator also delivers a voltage proportional to the absolute phase difference phase shift between the two carriers.

In the preferred embodiment described in detail hereinafter, the oscillation generator has an operating frequency equal to a multiple of the modulating frequency $f_m$; the wave-shaping circuit in that case includes a multistage binary frequency divider. A combination of stage outputs of this frequency divider are available for the periodic actuating of a gating-pulse generator controlling the read-out of the discriminator output through a sampling and holding circuit.

According to a further feature of our invention, the same gating-pulse generator controls the read-out of an attenuation detector and of an analog frequency indicator which are connected to the receiver downstream and upstream, respectively, of a low-pass filter forming part of the amplitude demodulator. A synchronizing circuit may also be connected to the filter output, in parallel with the phase discriminator and the attenuation detector, to isolate the aforedescribed characteristic frequency $f_r$ from the carrier envelope and to derive therefrom one resetting pulse per switching cycle for a pulse counter in the discriminator output serving to generate two timing pulses during respective halves of a switching cycle. A gating circuit responds to these timing pulses with passage of phasing pulses of opposite polarities from the output of the phase comparator, the pulses of one polarity denoting a lead and the pulses of the other polarity denoting a lag in the phase of the measuring square wave relative to the reference square wave. By integration we can convert these phasing pulses into a sinusoidal oscillation of frequency $f_c$ whose amplitude, like the width of the phasing pulses, is proportional to the phase difference between the two square waves applied to the comparator.

Advantageously, the synchronizing circuit includes a band-stop filter eliminating the modulating frequency $f_m$ in the input of a recovery circuit, the latter comprising a band-pass filter transmitting the characteristic frequency $f_r$ and, inserted between these two filters, a harmonics suppressor designed to block harmonics of the commutation frequency $f_c$ which would fall into the pass band of the second filter.

The resetting pulse originating at the synchronizing circuit can also be used, pursuant to still another feature of our invention, to control a time-base circuit, including another chain of binary frequency dividers, in a digital frequency discriminator connected to the receiver upstream of its low-pass filter, advantageously through a squarer also forming part of the aforementioned frequency indicator. The time-base circuit measures two identical time intervals during respective halves of a switching cycle and, by alternately unblocking a pair of gates during these time intervals, gives passage to a succession of cycles of the two carrier frequencies $f_m$ and $f_r$ which are then individually counted to provide a reading of the absolute magnitudes of these carrier frequencies.

5. BRIEF DESCRIPTION OF THE DRAWING

The above and other features of our invention will now be described in detail hereinafter with reference to the accompanying drawing in which.

Figure 3A:
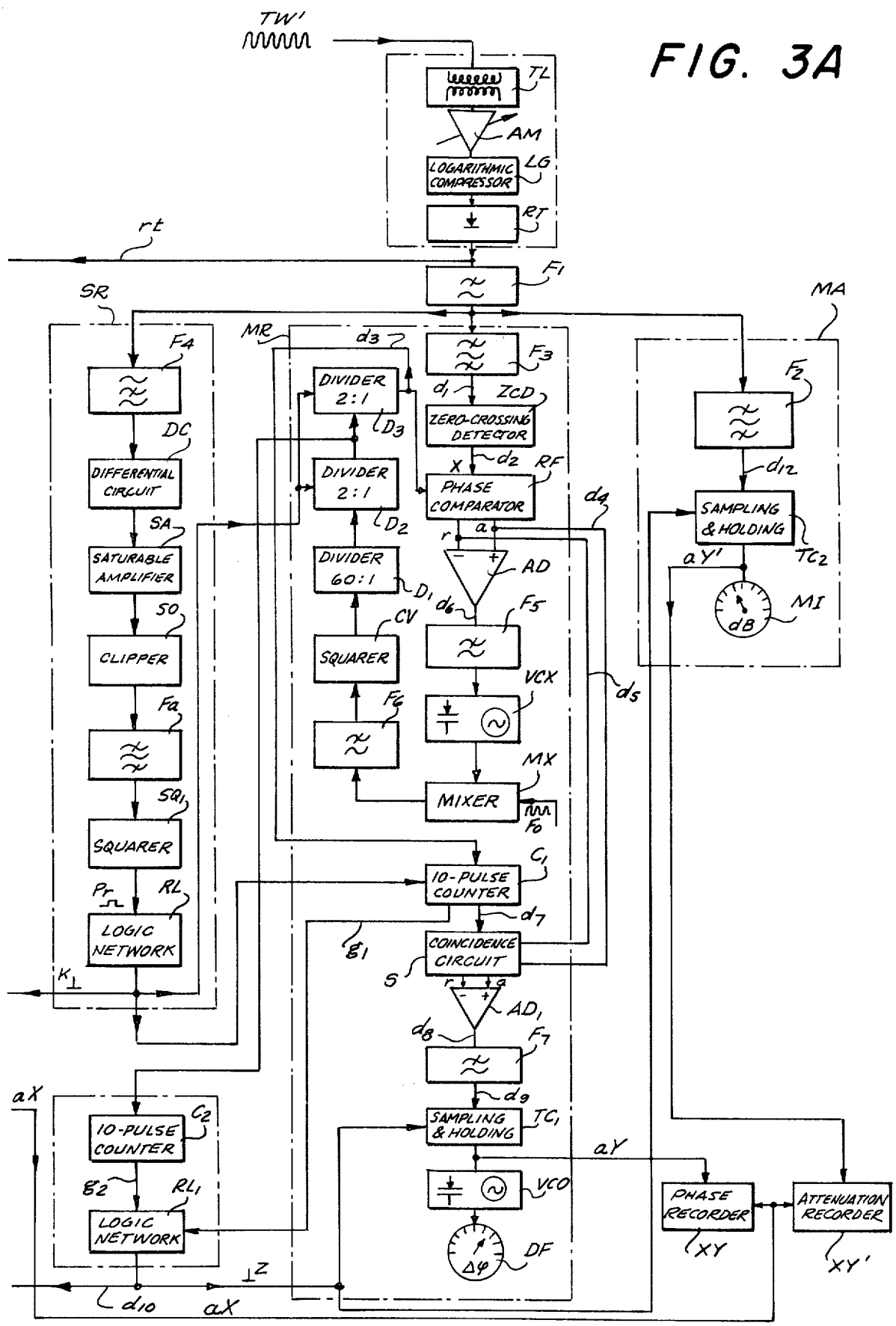
Figure 3B:
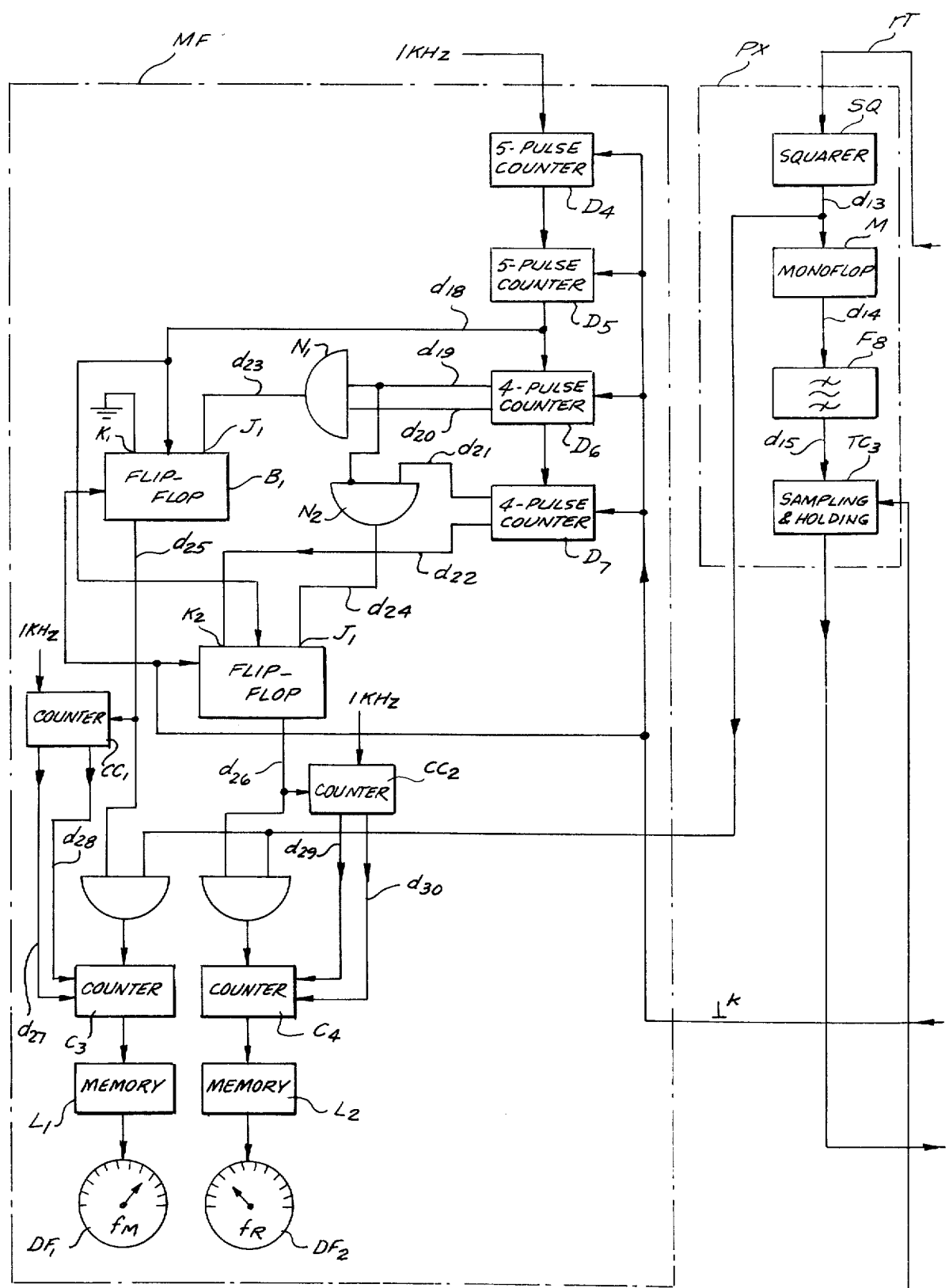
Figure 4:
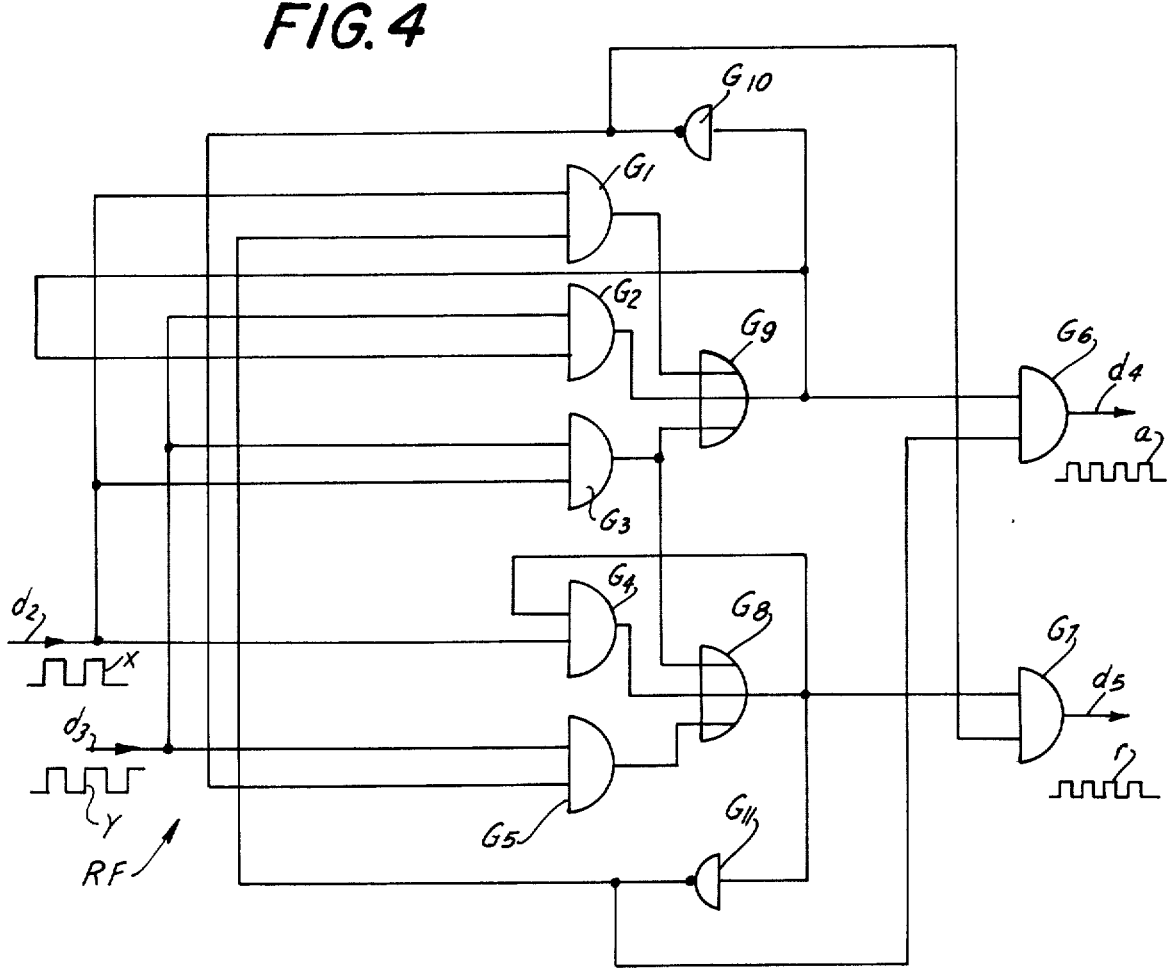
Figure 5:
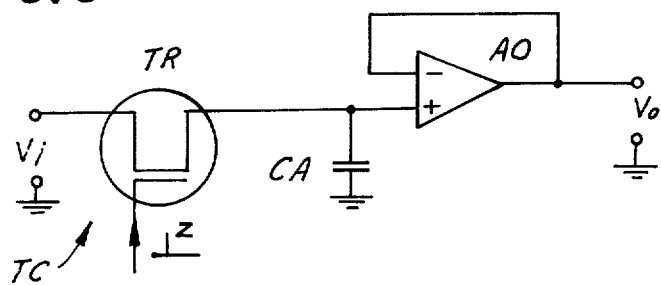
Figure 6:
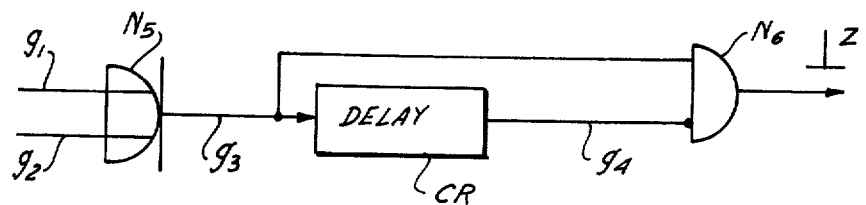
Figure 7:
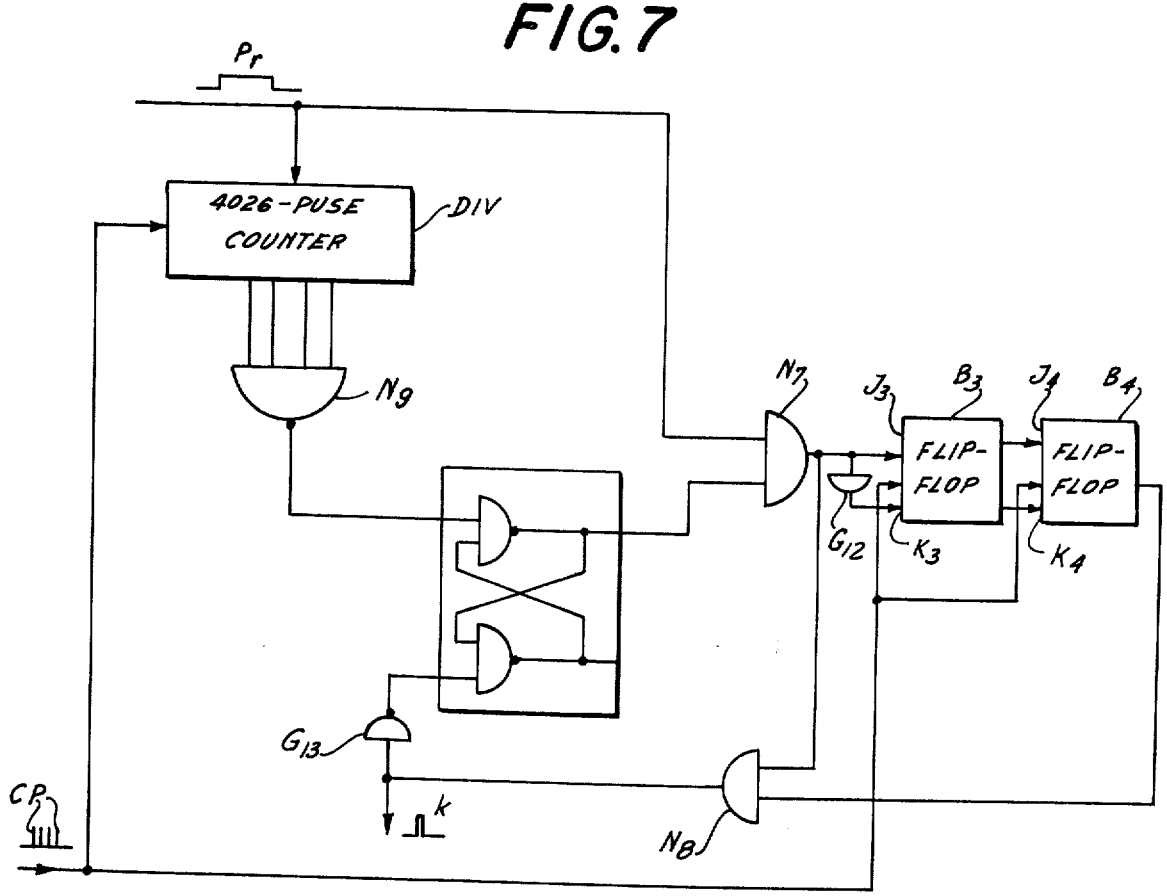
Figure 8A:
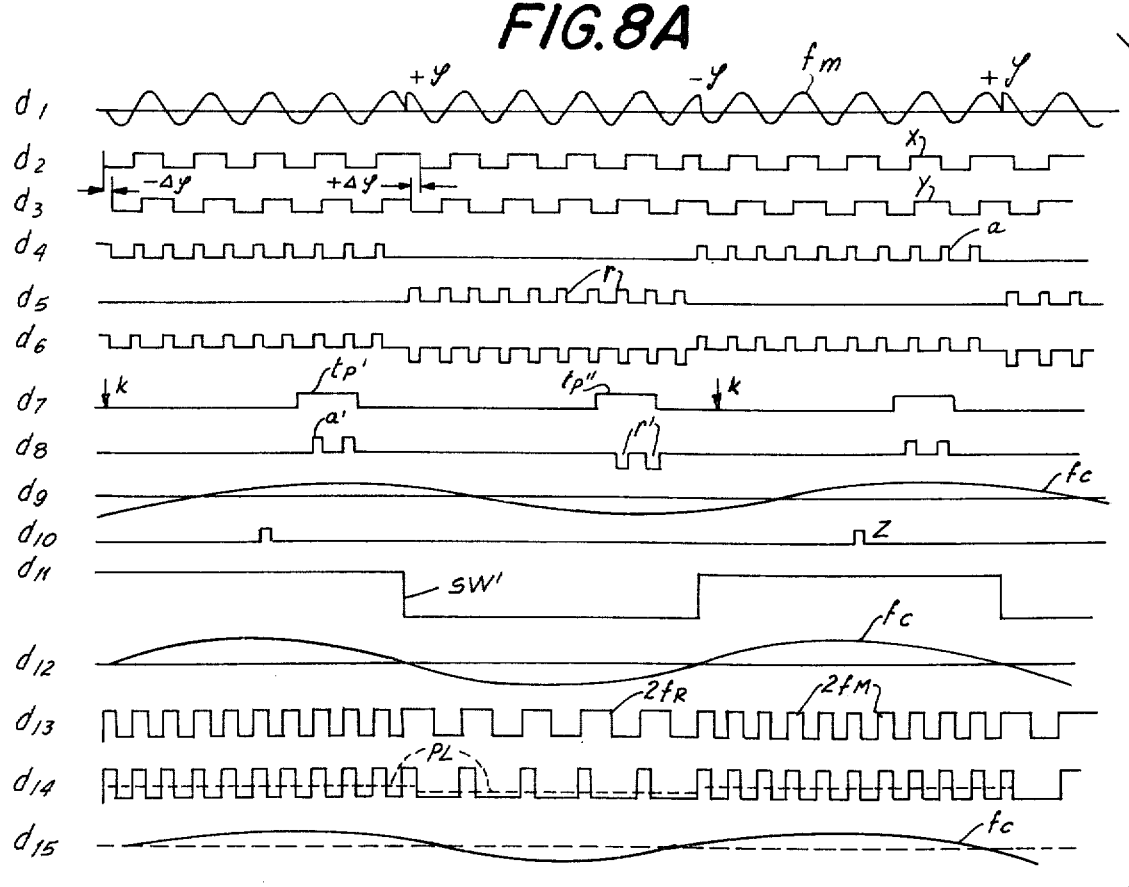
Figure 8B:
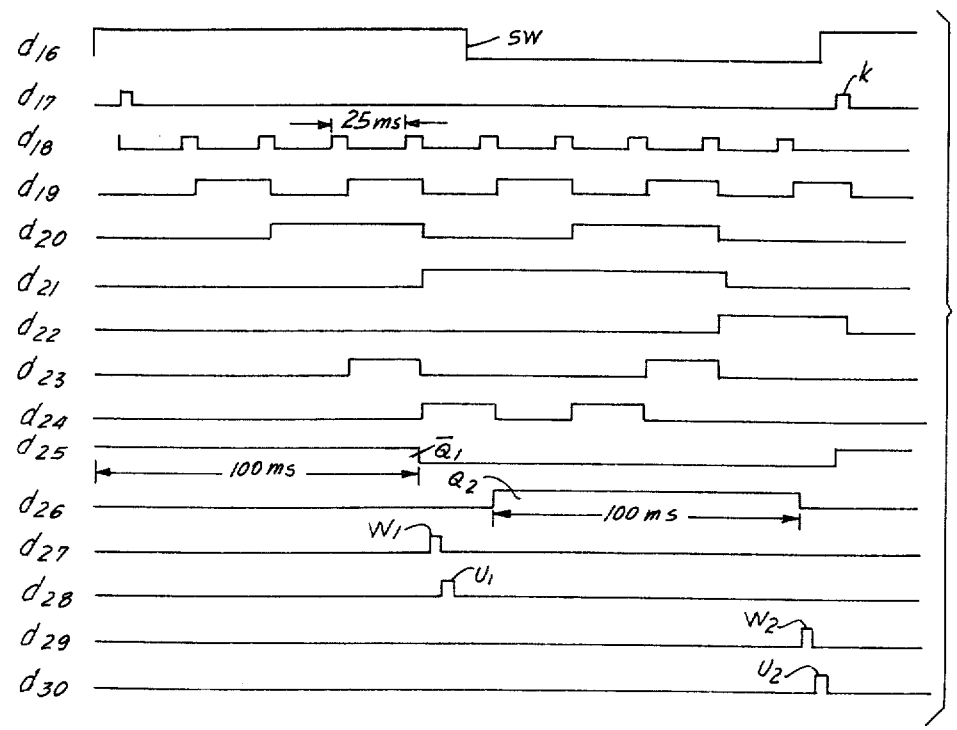
Figure 9:
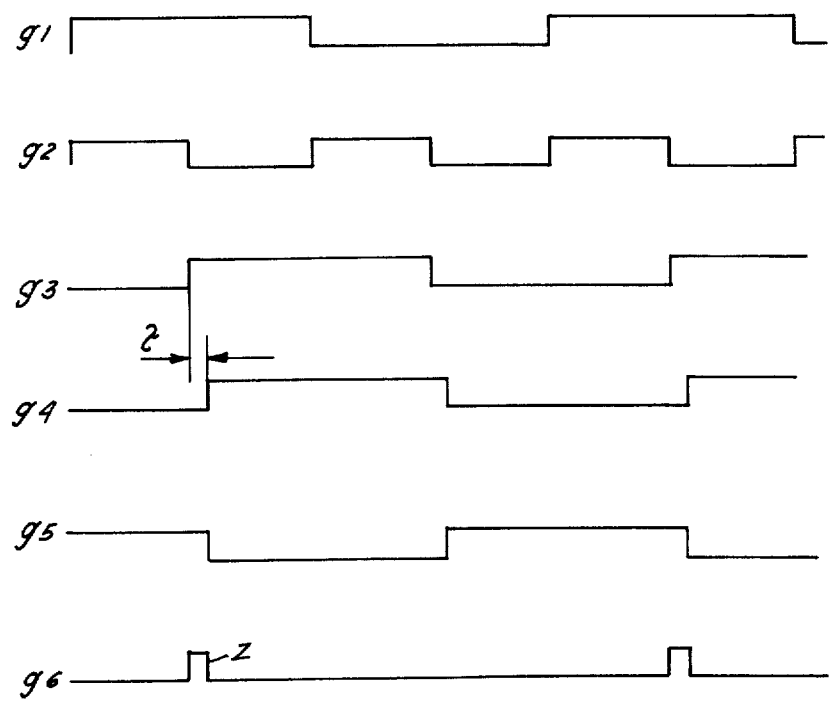

FIGS. 3A and 3B, when placed side by side, are a block diagram of a receiving and processing station for the transmitted test wave;

FIg. 4 is a more detailed circuit diagram of a phase comparator forming part of a phase discriminator shown in FIG. 3A;

FIG. 5 is a diagram of a sampling and holding circuit representative of several such circuits shown in block form in FIGS. 3A and 3B;

FIG. 6 is a diagram of a logic network forming part of a gate-control circuit shown in FIG. 3A;

FIG. 7 is a diagram of another logic network forming part of a synchronizing circuit shown in FIG. 3A;

FIGS. 8A and 8B are two sets of graphs respectively relating to the operation of the parts of the system shown in FIGS. 3A and 3B; and FIG. 9 is a set of graphs relating to the operation of the logic network of FIG. 6.

6. SPECIFIC DESCRIPTION

Figure 1:
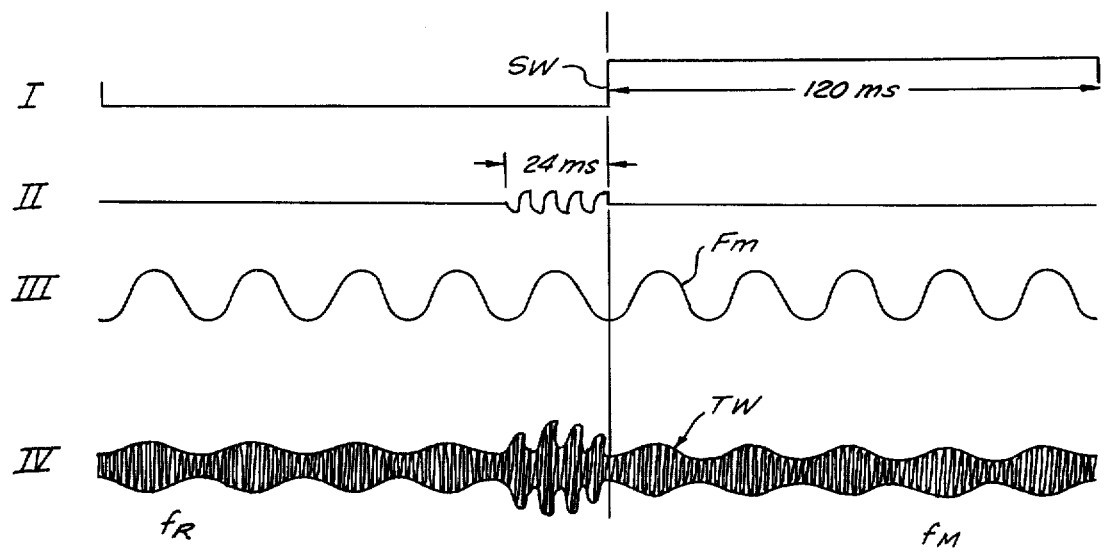
FIG. 1 is a set of graphs illustrating the composition of a test wave utilized in a system embodying our invention.

In FIG. 1 we have shown in graph I a rectangular switching signal SW whose cycle, in this specific instance, measures 240 ms corresponding to a fundamental frequency $f_c = 4.167$ Hz. During the same period, as illustrated in graph III, there are generated two cycles of a modulating frequency $f_m = 41.67$ Hz. During an interval of 24 ms, coinciding with the fifth cycle of frequency $f_m$ and occurring therefore just before the instant of switchover midway in the switching cycle, there comes into existence a characteristic frequency $f_r = 166.7$ Hz as shown in graph II. The wave form of this characteristic frequency is nonsinusoidal and generally exponential, for reasons which will later become apparent.

Switching signal SW controls the changeover between a standard carrier of reference frequency $f_R$ and a selected carrier of measuring frequency $f_M$, as indicated in graph IV which represents a composite test wave TW synthesized from the two alternating carriers, the common modulating frequency $f_m$ and the periodically recurring characteristic frequency $f_r$.

Figure 2:
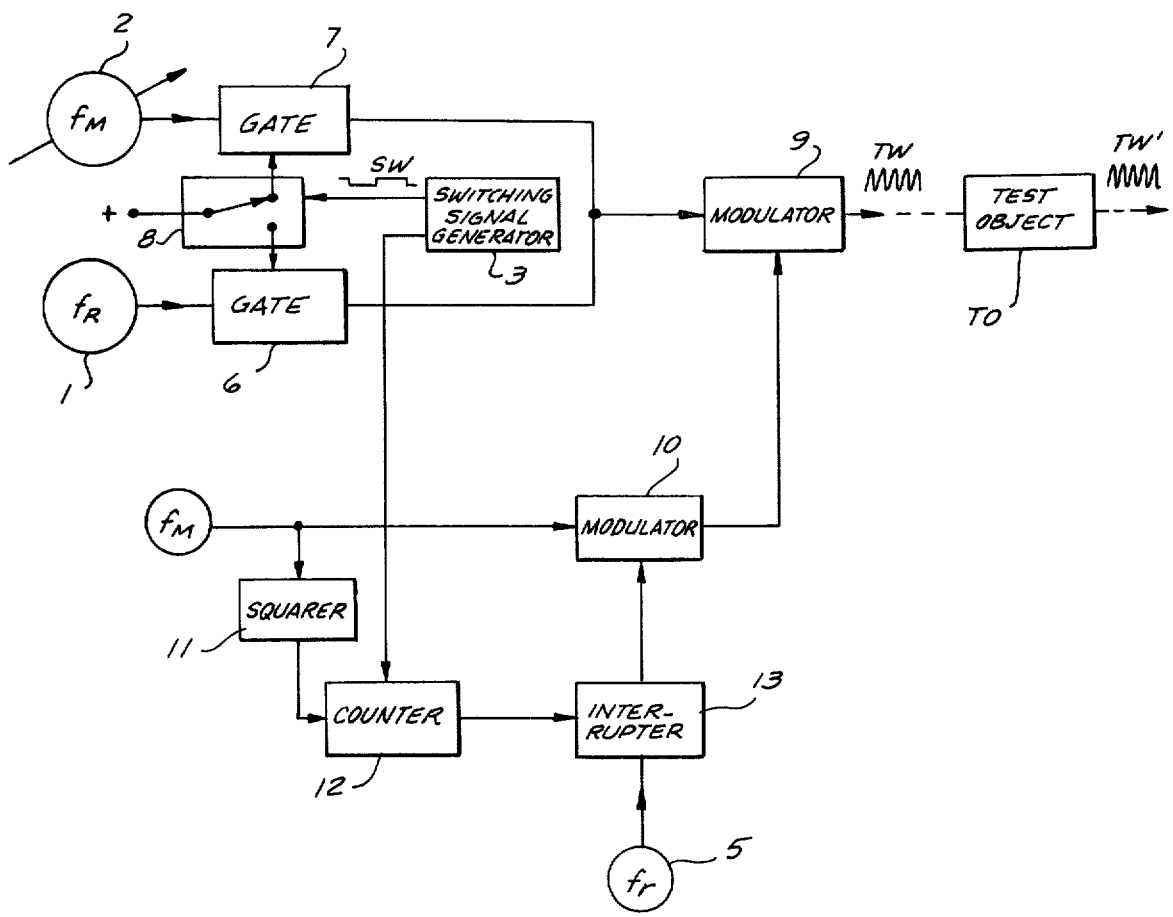
FIG. 2 is a block diagram of a circuit for generating such a test wave to be transmitted through a test object.

The generation of this test wave TW has been illustrated in FIG. 2 which shows a transmitting station including a fixed reference-frequency oscillator 1, an adjustable measuring-frequency oscillator 2, a switching-signal generator 3, a modulating-frequency oscillator 4 and a characteristic-frequency oscillator 5. Two gates 6, 7 in the outputs of oscillators 1 and 2 are alternately blocked and unblocked by a preferably electronic switch 8 under the control of signal SW from generator 3. The alternately conducting gates 6 and 7 work into a modulator 9 also receiving the frequency $f_m$ from oscillator 4 by way of another modulator 10. Oscillator 4 further works into a squarer 11 whose output is fed to a 10-pulse counter 12 which is periodically reset by the switching-signal generator 3 and which on a count of five closes an interrupter 13 inserted between oscillator 5 and modulator 10. The resulting wave TW is then transmitted through a test object TO, distorting it to a wave TW', to a receiving station illustrated in FIGS. 3A and 3B.

As illustrated in FIG. 3A, the incoming test wave TW' arrives at a receiver SIR including an input transformer TL whose primary winding, in case of a telephone or other telecommunication system, may also be traversed by direct current serving to maintain an established connection in a manner not further relevant to this description. Transformer TL works into an amplifier AM whose gain can be manually adjusted to an optimum signal level for further processing. Amplifier AM is followed by a logarithmic compressor LG which, in a manner known per se, reduces the amplitude excursions of the incoming wave resulting from the different degrees of attenuation which the two carriers $f_R$ and $f_M$ undergo in the test object, these carriers originally having the same amplitude at the transmission station of FIG. 2. Owing to this logarithmic reduction, the difference in signal level downstream of compressor LG is proportional to the ratio of the carrier amplitudes in wave TW'.

The modified test wave exiting from compressor LG is rectified in a full-wave rectification circuit RT forming part of an amplitude demodulator which also includes a low-pass filter $F_1$ blocking the carrier frequencies $f_R$ and $f_M$. These carrier frequencies, however, are still present in the output of rectifier RT from which thay are transmitted via a lead $rt$ to a squarer SQ shown in FIG. 3B. The carrier envelope, appearing in the output of filter $F_1$, consists essentially of the modulating frequency $f_m$ periodically supermodulated by frequency $f_r$ as described above. A phase discriminator MR comprises a band-pass filter $F_3$ receiving that envelope from filter $F_1$ and suppressing its frequency components $f_r$ and $f_c$; filter $F_3$ selectively passes the modulating frequency $f_m$ so as to give rise on its output lead $d_1$ to a sine wave of this frequency as illustrated in the correspondingly designated graph of FIG. 8A. Within a switching cycle of 240 ms as established by the signal SW, which for comparison has been indicated in graph $d_{11}$ of FIG. 8A, the wave of graph $d_1$ undergoes two opposite phase shifts $+\phi$ and $-\phi$ coinciding with the instants of switchover. This wave is fed to a zero-crossing detector ZCD acting as a squarer, as heretofore described, whose output lead $d_2$ (as shown on the correspondingly designated graph of FIG. 8A) carries a measuring square wave $x$ precisely in step with the sine wave of graph $d_1$.

A tunable local oscillator VCX of the voltage-controlled type, containing a varactor in its tank circuit, forms part of a phase-locking loop further including a mixer MX, a low-pass filter $F_6$, a squarer CV, a binary frequency divider with stages $D_1$, $D_2$, $D_3$, a phase comparator RF, a differential amplifier AD, and another low-pass filter $F_5$ working into a control input of that oscillator. Mixer MX receives on one input the operating frequency of oscillator VCX and on another input a constant heterodyning frequency $f_0$ from a non-illustrated local oscillator which, like oscillator VCX, is preferably crystal-controlled for the sake of frequency stability; in conformity with CCITT standards, the operating frequency of oscillator VCX may be adjustable in a range allowing for tolerances of up to ± 0.5 percent of modulating frequency $f_m$. In the specific example here considered, the mean operating frequency of this oscillator is 990 kHz with $f_0 = 1$ mHz; the resulting beat frequency of 10 kHz = $240 f_m$ is isolated from the mixer output by the filter $F_6$ and is subsequently squared in circuit CV for delivery to the frequency divider $D_1-D_3$. With stages $D_1$, $D_2$ and $D_3$ having respective step-down ratios of 60 : 1, 2 : 1 and 2 : 1, the overall ratio is 240 : 1 to produce on an output lead $d_3$ of final stage $D_3$ a reference square wave $y$ of frequency $f_m$ as shown in graph $d_3$ of FIG. 8A.

The two square waves $x$ and $y$ are fed to phase comparator RF which, in a manner more fully described hereinafter with reference to FIG. 4, generates two alternate pulse trains $a$ and $r$ on its output leads $d_4$ and $d_5$ as illustrated in the correspondingly designated graphs of FIG. 8A. Pulses $a$, coming into existence during the first half of a switching cycle in which carrier frequency $f_R$ is present in the incoming test wave, have a width corresponding to the phase difference $-\Delta\phi$ occurring whenever the leading and trailing edges of measuring square wave $x$ (of mean frequency $f_m$) lead the corresponding edges of reference square wave $y$ as indicated in FIG. 8A; similarly, the pulses $r$ come into existence during the second half of a switching cycle (with carrier $f_R$ replaced by carrier $f_M$) in which, under the conditions here assumed, the leading and trailing edges of measuring square wave $x$ lag behind the corresponding edges of reference square wave $y$ with a phase shift $+\Delta\phi$ proportional to the width of pulses $r$.

Differential amplifier AD, receiving the phasing pulses $r$ on its inverting input and the phasing pulses $a$ on its noninverting input, produces on its output lead $d_6$ a train of alternately positive and negative groups of pulses as shown in graph $d_6$ of FIG. 8A. Filter $F_5$ integrates these two pulse groups so that its output is zero when their pulse widths are alike, the operating frequency of oscillator VCX being unchanged in that instance. Otherwise, filter $F_5$ emits a corrective signal which readjusts the oscillator frequency to make the absolute values of the two phase shifts $+\Delta\phi$ and $-\Delta\phi$ equal to each other, i.e. to maintain reference square wave $y$ centered relative to measuring square wave $x$.

A 10-pulse counter $C_1$ is stepped by the square wave $y$ from divider stage $D_3$ and is periodically reset, once per switching cycle, by a pulse $k$ originating at a synchronizing circuit SR more fully described below. An output lead $d_7$ of counter $C_1$ carries a pair of timing pulses $tp'$ and $tp''$ upon reaching a count of four and of nine, respectively, i.e. in the fourth and in the ninth period of square wave $y$ (counting from resetting pulse $k$) as shown in graph $d_7$ of FIG. 8A. Timing pulse $tp'$ spans two consecutive phasing pulses $a$ whereas timing pulse $tp''$ spans two consecutive phasing pulses $r$ in the output of comparator RF; thus, a coincidence circuit S with inputs connected to leads $d_4, d_5$ and $d_7$ passes two pulses $a$ in the first half and two pulses $r$ in the second half of each switching cycle. Coincidence circuit S directs the pulse pairs $r$ to an inverting input and the pulse pairs $a$ to a noninverting input of another differential amplifier AD$_1$ whose output lead $d_8$ therefore carries alternating positive and negative pulse pairs $a'$ and $r'$ as illustrated in the corresponding graph of FIG. 8A.

The succession of pulses on lead $d_8$ has a fundamental frequency $f_c$ which is recovered by a low-pass filter $F_7$ generating on its output lead $d_9$ a sinusoidal oscillation as represented in the correspondingly labeled graph of FIG. 8A; the amplitude of that oscillation is proportional to the pulse width and therefore to the phase shift $\Delta\phi$. Filter $F_7$ works into a normally blocked sampling and holding circuit $TC_1$, more fully described hereinafter with reference to FIG. 5, which is periodically unblocked by a gating pulse Z generated once per switching cycle on an output lead $d_{10}$ of a gate-control circuit SC; while gating pulse Z (graph $d_{10}$ of FIG. 8A) does not exactly coincide with the peak of the sine wave in the output of filter $F_7$, the instantaneous wave amplitude read out by the pulse varies in proportion to the peak amplitude. The cumulative value of the amplitude samples stored in circuit $TC_1$ gives rise to an analog output voltage $aY$ controlling on the one hand a tunable local oscillator VCO, similar to oscillator VCX, and on the other hand the displacement of a stylus or the like in the Y direction within a recording instrument XY; the movement of the recording medium in the X direction occurs under the control of an analog signal $aX$ delivered by an analog frequency indicator PX, which includes the squarer SQ, shown in FIG. 3B and described in detail hereinbelow. The output frequency of oscillator VCO is translated into a reading of a meter DF calibrated in terms of phase difference $\Delta\phi$.

The analog signal $aX$, as will be shown below, is a d-c voltage of a magnitude proportional to the difference in frequency between carriers $f_R$ and $f_M$. Thus, with progressive changes in the selected measuring frequency $f_M$ the recorder will register phase delay plotted against frequency.

Gate-control circuit SC comprises a binary counter $C_2$, with a counting capacity of 10 pulses, stepped at a cadence $2f_m$ from the output of divider $D_2$. A logic network $RL_1$, more fully described below with reference to FIGS. 6 and 9, receives a square wave of frequency $f_m/10 = f_c$ over an output lead $g_1$ of counter $C_1$ and a square wave of frequency $2f_m/10 = 2f_c$ over an output lead $g_2$ of counter $C_2$. Gating pulse Z generated by network $RL_1$ occurs about midway in the second half of each switching cycle as depicted in graph 1 of FIG. 1.

Connected in parallel with frequency discriminator MR to the output of filter $F_1$ is an attenuation detector MA comprising a band-pass filter $F_2$ designed to feed the commutation frequency $f_c$ to a sampling and holding circuit $TC_2$. This circuit is periodically activated by the gating pulses Z to accumulate amplitude samples of a sine wave of frequency $f_c$ appearing on an output lead $d_{12}$ of filter $F_2$ as indicated in the corresponding graph of FIG. 8A. A replica of the switching signal SW shown in graph $d_{11}$ is present in the carrier envelope, exiting from filter $F_1$, and has an amplitude proportional to the difference in attenuation (as modified by the compressor LG) experienced by carriers $f_R$ and $f_M$. The sine wave of graph $d_{12}$ represents the fundamental frequency of this switching signal and, of course, varies in amplitude with the difference in attenuation or damping factor. Thus, an analog voltage $aY'$ accumulated in circuit $TC_2$ can be used to control a meter MI, calibrated for example in decibels, as well as the stylus of an attenuation recorder XY' also receiving the analog input signal $aX$ from frequency indicator PX to drive its recording medium so as to register attenuation plotted against measuring frequency $f_M$.

Synchronizing circuit SR comprises an input filter $F_4$ of the band-stop type connected in parallel with filters $F_2$ and $F_3$ to the output of filter $F_1$. Filter $F_4$ eliminates from the carrier envelope the modulating frequency $f_m$ so as to pass a wave consisting essentially of the reconstituted switching signal SW and the characteristic frequency $f_r$ along with related harmonics. Since the switching signal contains higher harmonics in the vicinity of this characteristic frequency, it behooves to suppress these harmonics before recovering the frequency $f_r$ in a band-pass filter $F_9$ downstream of filter $F_4$. For this purpose we insert between the two filters a differentiation circuit DC, a saturable amplifier SA and a clipper SO. Differentiation circuit DC converts the rectangular switching signal into a generally exponential voltage with sharp peaks occurring at the instants of switchover; however, owing to the exponential wave shape of the sawteeth of caracteristic frequency $f_r$, these sawteeth are not significantly modified by the differentiator and substantially retain their original amplitude. Amplifier SA is overdriven by the aforementioned voltage peaks so as to distort the output of differentiation circuit DC with substantial suppression of higher harmonics present in the rectangular signal. Clipper SO cuts off the output signal of amplifier SA well above the level of the sawteeth of frequency $f_r$ which are therefore preserved for extraction of that frequency by filter $F_9$. A squarer $SQ_1$ converts the consecutive peaks of frequency $f_r$ (there being four such peaks per switching cycles in the chosen example) into a single pulse $P_r$ having a duration of approximately 24 ms; this pulse is delivered to a logic network RL, shown in detail in FIG. 7 described hereinafter, which produces the resetting pulse $k$. Owing to delays introduced in circuit SR, pulse $k$ occurs about 30 ms after the beginning of the supermodulation interval of frequency $f_r$ (equal to 24 ms) in the detected carrier envelope, i.e. approximately 6 ms after the switchover from reference frequency $f_R$ to measuring frequency $f_M$. This has been best illustrated in FIG. 8B where graph $d_{16}$ shows once more the switching signal SW (on a scale slightly larger than that of graph $d_{11}$ of FIG. 8A) while graph $d_{17}$ depicts the pulses $k$.

Analog frequency indicator PX of FIG. 3B comprises, in the output of squarer SQ, a monostable multivibrator or monoflop M with an off-normal period equal to half a cycle of the highest carrier frequency to be received, a band-pass filter $F_8$ transmitting the commutation frequency $f_c$, and a sampling and holding circuit $TC_3$ again controlled by the gating pulses Z. Circuit SQ develops, on its output lead $d_{13}$, a square wave (shown in the correspondingly designated graph of FIG. 8A) whose frequency alternates between $2f_R$ and $2f_M$, owing to the frequency-doubling effect of full-wave rectifier RT; for the sake of clarity, the width of its pulses relative to that of square waves $x$ and $y$ has been greatly exaggerated in graph $d_{13}$, the same as that of a pulse train (graph $d_{14}$) on the output lead $d_{14}$ of monoflop M. The pulse spacing of this latter train varies inversely with frequency and the mean pulse level PL, indicated in dotted lines, is a square wave synchronous with switching signal SW but of an amplitude which is proportional to the difference between frequencies $f_R$ and $f_M$. The fundamental sine wave of frequency $f_c$, passed by filter $F_8$, appears on an output lead $d_{15}$ thereof and has been illustrated in the graph so designated in FIG. 8A; its amplitude, too, is a direct function of that frequency difference. Thus, the analog voltage $aX$ stored in circuit $TC_3$ is a measure of the magnitude of frequency $f_M$.

FIG. 3B also shows a digital frequency discriminator MF including a time-base circuit with four cascaded frequency dividers, i.e. two five-pulse counters $D_4$, $D_5$ and two four-pulse counters $D_6$, $D_7$. Counter $D_4$ is stepped by pulses with a cadence of 1 KHz; all four counters are periodically reset by the pulses $k$ from circuit SR. The output lead $d_{18}$ of counter $D_5$, as shown in the correspondingly designated graph of FIG. 8B, carries a train of pulses with a recurrence period of 25 ms which is fed to a central input of a flip-flop $B_1$ of J-K type having collateral inputs $K_1$, $J_1$ as well as a resetting input receiving the pulses $k$. Input $K_1$ is permanently grounded, i.e. inoperative; flip-flop $B_1$, once set by a combination of a trigger pulse on its central input and a biasing pulse on input $J_1$, can therefore be reset only upon the recurrence of pulse $k$. counter $d_6$ consists of two binary stages with respective outputs $d_{19}$ and $d_{20}$ carrying square waves of 20 Hz and 10 Hz, respectively, as illustrated in the corresponding graphs of FIG. 8B. Leads $d_{19}$ and $d_{20}$ terminate at respective inputs of an AND gate $N_1$, lead $d_{19}$ also extending to an inverting input of an AND gate $N_2$ whose other (noninverting) input is tied to the first stage output $d_{21}$ of counter $D_7$ which also consists of two binary stages. The output lead $d_{23}$ of AND gate $N_1$ terminates at input $J_1$ of flip-flop $B_1$ and carries two pulses per switching cycle, as indicated in graph $d_{23}$ of FIG. 8B. The first of these pulses coincides with the fourth trigger pulse on lead $d_{18}$ (as counted from the last resetting pulse $k$) whose trailing edge sets the flip-flop $B_1$, thereby terminating the energization of its reset output $d_{25}$ as indicated at $\overline{Q}_1$ in the corresponding graph.

A second flip-flop $B_2$ of similar type, with collateral inputs $J_2$ and $K_2$, has its central input connected in parallel with that of flip-flop $B_1$ to lead $d_{18}$. The output lead $d_{22}$ of the divider chain $D_4$–$D_7$, emanating from the second stage of counter $D_7$, terminates at input $K_2$ of flip-flop $B_2$ which also has a resetting input connected in parallel with that of flip-flop $B_1$ to receive the pulses $k$. However, during normal operation the resetting of flip-flop $B_2$ occurs in the trailing edge of the ninth trigger pulse on lead $d_{18}$ (counting from the last resetting pulse $k$) which coincides with the energization of input $K_2$ as indicated in graph $d_{25}$. Input $J_2$ is tied to the output lead $d_{24}$ of AND gate $N_2$ which, as shown in the correspondingly labeled graph of FIG. 8B, carries two pulses per switching cycle; the first of these pulses coincides with the fifth trigger pulse on lead $d_{18}$ whose trailing edge therefore sets the flip-flop $B_2$, energizing its set output $d_{26}$ as indicated at $Q_2$ in the corresponding graph.

Pulse $\overline{Q}_1$, measuring an interval of 100 ms during the half of a switching cycle in which the measuring frequency $f_M$ is being received, unblocks an AND gate $N_3$ having an input connected to output lead $d_{13}$ of squarer SQ. Gate $N_3$ works into a pulse counter $C_3$ which therefore receives one pulse for each half-cycle of the selected carrier frequency throughout this interval. An ancillary counter $CC_1$, stepped at a rate of 1 KHz from the same source as counter $D_4$, emits two consecutive pulses immediately after the termination of timing pulse $\overline{Q}_1$, i.e. a transfer pulse $W_1$ on a lead $d_{27}$ and a zero-setting pulse $U_1$ on a lead $d_{28}$ as shown in the corresponding graphs. Pulse $W_1$ transmits the contents of counter $C_3$ to a memory $L_1$ whereupon pulse $U_1$ clears that counter preparatorily to a repetition of the process. In an analogous manner, pulse $Q_2$ measures an interval of 100 ms during the other half of a switching cycle, i.e. during reception of the reference frequency $f_R$, with unblocking of an AND gate $N_4$ also having an input connected to squarer output $d_{13}$. Gate $N_4$ works into a pulse counter $C_3$ which therefore receives one pulse for each half-cycle of the standard carrier frequency used for comparison. An ancillary counter $CC_2$ is stepped at the same rate as counter $CC_1$ to emit a transfer pulse $W_2$ on a lead $d_{29}$ and a zero-setting pulse $U_2$ on a lead $d_{30}$, as shown in the corresponding graphs of FIG. 8B, to clear the counter $C_4$ after its contents have been transmitted to a memory $L_2$. The counts stored in memories $L_1$ and $L_2$ are displayed on two meters $DF_1$ and $DF_2$ calibrated in terms of frequency (e.g. in KHz) of carriers $f_M$ and $f_R$, respectively.

Naturally, the count for a given carrier frequency could be lowered by using half-wave instead of full-wave rectification and/or by the insertion of frequency dividers between squarer SQ and gates N3, N4.

In FIG. 4 we have shown details of phase comparator RF which receives the square waves $x$ and $y$ on its input leads $d_2$ and $d_3$, respectively. Comparator RF comprises five AND gates $G_1$–$G_5$ working into two OR gates $G_8$ and $G_9$ which in turn feed two further AND gates $G_6$ and $G_7$ with output leads $d_4$ and $d_5$.

More particularly, input lead $d_2$ extends to AND gates $G_1$, $G_3$ and $G_4$ in parallel; input lead $d_3$ is similarly connected to AND gates $G_2$, $G_3$ and $G_5$. OR gate $G_8$, receiving the outputs of AND gates $G_3$–$G_5$, feeds the AND gates $G_4$ and $G_7$ and, through an inverter $G_{11}$, the AND gates $G_1$ and $G_6$. OR gate $G_9$, receiving the outputs of AND gates 1–3, feeds the AND gates $G_2$ and $G_6$ and, through an inverter $G_{10}$, the AND gates $G_5$ and $G_7$.

If the two square waves $x$ and $y$ happen to be exactly in phase, gate $G_3$ conducts and energizes both OR gates $G_8$ and $G_9$. This blocks both output gates $G_6$ and $G_7$ so that no pulses appear on leads $d_4$ and $d_5$.

In the more general case, however, the two square waves will be relatively dephased as explained above with reference to FIGS. 3A and 8A. With wave $x$ leading wave $y$, the initial exclusive energization of lead $d_2$ results in the conduction of gate $G_1$ which is not blocked inasmuch as OR gate $G_8$ has no output. OR gate $G_9$ now conducts and generates a pulse $a$ in the output of gate $G_6$ while blocking the gate $G_7$. At the same time the gate $G_2$ is unblocked for the passage of the overlapping pulse of wave $y$ whose subsequent appearance, however, opens the gates $G_3$ and $G_8$ so as to inhibit further conduction of gate $G_6$. Upon the termination of the pulse of wave $x$, though, gate $G_6$ is reopened to pass another pulse $a$ as long as the pulse of wave $y$ remains in existence. Thus, the width of pulse $a$ equals the relative offset of the two square waves at both the leading and trailing edges of their pulses.

By the same token, gate $G_5$ is made conductive if the wave $y$ leads the wave $x$, with gate $G_8$ now blocking the gate $G_6$ while generating a pulse $r$ on the output lead $d_5$ of gate $G_7$. Again, the conduction of gate $G_3$ during coincidence of the two pulses temporarily de-energizes the lead $d_5$ but a second pulse $r$ occurs at the trailing end of the lagging pulse of wave $x$. Pulses $r$ are therefore also of a width equaling the relative phase shift of the two square waves.

FIG. 5 shows a sampling and holding circuit TC representative of circuits $TC_1$, $TC_2$ and $TC_3$ shown in FIG. 3A and 3B. The circuit includes a transistor TR, here specifically a field-effect transistor, with an input voltage $V_i$ applied to its source and with pulses Z periodically delivered to its gate. The drain of this FET is connected to a capacitor CA and to the noninverting input of an operational amplifier AO delivering an output voltage $V_o$.

Capacitor CA forms part, together with nonillustrated leakage resistances, of a time-constant network which integrates the samples of voltage $V_i$ periodically passed by the transistor TR. Amplifier AO has a high input resistance which effectively decouples this capacitor from the downstream circuits.

Reference will now be made to FIG. 6 for a description of logic network $RL_1$ included in the gate-control circuit SC of FIG. 3A. Network $RL_1$ comprises an Exclusive-OR gate $N_5$ with input leads $g_1$ and $g_2$ receiving the square waves illustrated in the correspondingly designated graphs of FIG. 9, i.e. a first square wave of frequency $f_c$ from counter $C_1$ and a second square wave of frequency $2f_c$ from counter $C_2$. The output lead $g_3$ of gate $N_5$ extends to a first input of an AND gate $N_6$ and has a branch $g_4$ terminating at an inverting second input of that gate, this branch including a delay circuit CR. The two leads $g_3$ and $g_4$ carry identical square waves of frequency $f_c$, as illustrated in the corresponding graphs of FIG. 9, with a slight relative staggering $\tau$ due to the delay introduced by circuit CR. Graph $g_5$ shows the delayed square wave as inverted at the input of AND gate $N_6$; the result of this inversion is a pulse Z, of width $\tau$, in the output of gate $N_6$ shown in graph $g_6$ of FIG. 9.

FIG. 7 gives the details of the logic network RL forming part of synchronizing circuit SR (FIG. 3A). It comprises a frequency divider DIV in the form of a pulse counter stepped by clock pulses CP with a recurrence rate or cadence of 500 KHz. A resetting input of counter DIV is connected in parallel with an input of an AND gate $N_7$ to the output of squarer $SQ_1$ (FIG. 3A) to receive the pulse $P_r$ therefrom. AND gate $N_7$ works into an input $J_3$ and through an inverter $G_{12}$ into an input $K_3$ of a flip-flop $B_3$ of the J-K type whose central input is triggerable by the clock pulses CP. The set and reset outputs of flip-flop $B_3$ are connected to respective inputs $J_4$ and $K_4$ of a similar flip-flop $B_4$ having its central input connected in parallel with that of flip-flop $B_3$ to the source of clock pulses. The reset output of flip-flop $B_4$ extends to an input of another AND gate $N_8$ having a second input tied to the output of gate $N_7$.

A flip-flop FF of the set/reset type has a set output connected to the second input of gate $N_7$. The second input of flip-flop FF is energized from counter DIV through a NAND gate $N_9$ which maintains this flip-flop reset until the count reaches a predetermined value, here specifically 4026 clock pulses. The resetting input of flip-flop FF is also normally energized from the output of AND gate $N_8$ through inverter $G_{13}$.

With counter DIV set to zero by the leading edge of a pulse $P_r$, flip-flop FF is set about 8 ms later, thus while the pulse $P_r$ is still present in the input of AND gate $N_7$. This gate then conducts and primes the flip-flop $B_3$ for setting by the next clock pulse CP. At this instant, AND gate $N_8$ is also rendered conductive to start the generation of a pulse $k$ while ineffectually de-energizing the resetting input of flip-flop FF through inverter $G_{13}$. The next clock pulse then sets the flip-flop $B_3$ to prime the flip-flop $B_4$ which is set by the immediately following clock pulse so as to cut off the AND gate $N_8$, thereby terminating the pulse $k$ after a very short period. Since the counter DIV has meanwhile advanced so that NAND gate $N_9$ conducts anew, flip-flop FF is now reset to reblock the AND gate $N_7$. Thus, the two succeeding clock pulses reset first the flip-flop $B_3$ and then the flip-flop $B_4$ to restore the normal condition of the circuit. The counting cycle of divider DIV may be restarted on the count 4026 or on some higher count.

We claim:

1. A system for measuring the relative phase shift between a selected carrier frequency $f_M$ and a standard carrier frequency $f_R$ on passing through a test object, said carrier frequencies being amplitude-modulated by a common modulating frequency $f_m$ and being alternately transmitted through said test object under the control of a switching signal with a commutation frequency $f_c$, comprising:

a receiver for said carrier frequencies provided with an amplitude demodulator for detecting a carrier envelope with a frequency component of said modulating frequency $f_m$ undergoing two opposite phase shifts during a switching cycle $1/f_c$;

a phase discriminator connected to the output of said amplitude demodulator and including zero-crossing detector for deriving from said envelope a measuring square wave in phase with said frequency component thereof;

a phase-locking loop in said phase discriminator including a tunable oscillation generator, wave-shaping means for deriving a reference square wave of frequency $f_m$ from the output of said oscillation generator, and a phase comparator receiving said measuring and reference square waves for producing a control signal proportional to the mean phase difference between said square waves to tune said oscillation generator with stabilization of the phase of said reference square wave at the mean phase of said measuring square wave; and output means in said phase discriminator for deriving from said phase comparator a voltage proportional to the absolute phase difference between said square waves as a measure of said relative phase shift.

2. A system as defined in claim 1 wherein said oscillation generator has an operating frequency equal to a multiple of said modulating frequency $f_m$, said wave-shaping means including a multistage binary frequency divider.

3. A system as defined in claim 2 wherein said oscillation generator comprises a voltage-controlled local oscillator, a source of constant frequency and mixer means connected to receive the outputs of said local oscillator and said source.

4. A system as defined in claim 2 wherein said output means includes a normally blocked read-out circuit, further comprising a gating-pulse generator for said read-out circuit with input connections to said frequency divider.

5. A system as defined in claim 1 wherein said phase comparator comprises a logic network with a first output energized by said measuring square wave in the absence of said reference square wave and with a second output energized by said reference square wave in the absence of said measuring square wave.

6. A system for measuring the relative phase shift between a selected carrier frequency $f_M$ and a standard carrier frequency $f_R$ on passing through a test object, said carrier frequencies being amplitude-modulated by a common modulating frequency $f_m$ and being alternately transmitted through said test object under the control of a switching signal with a commutation frequency $f_c$, comprising:

a receiver for said carrier frequencies provided with an amplitude demodulator for detecting a carrier envelope with a frequency component of said modulating frequency $f_m$ undergoing two opposite phase shifts during a switching cycle $1/f_c$;

a phase discriminator connected to the output of said amplitude demodulator and including conversion means for deriving from said envelope a measuring square wave in phase with said frequency component thereof;

a phase-locking loop in said phase discriminator including a tunable oscillation generator with an operating frequency equal to a multiple of said modulating frequency $f_m$, wave-shaping means including a multistage binary frequency divider for deriving a reference square wave of frequency $f_m$ from the output of said oscillation generator, and a phase comparator receiving said measuring and reference square waves for producing a control signal proportional to the mean phase difference between said square waves to tune said oscillation generator with stabilization of the phase of said reference square wave at the mean phase of said measuring square wave;

output means including a normally blocked read-out circuit in said phase discriminator for deriving from said phase comparator a voltage proportional to the absolute phase difference between said square waves as a measure of said relative phase shift; and a gating-pulse generator for said read-out circuit with input connections to said frequency divider.

7. A system as defined in claim 6 wherein said input connections include a first connection from a final stage output of said divider and a second connection from a preceding stage output of said divider, said gating-pulse generator comprising first coincidence means tied to said input connections, second coincidence means with two inputs connected via respective branch leads to the output of said first coincidence means, and delay means in one of said branch leads for establishing the length of a gating pulse.

8. A system as defined in claim 6, further comprising an attenuation detector connected in parallel with said phase discriminator to the output of said amplitude demodulator, said attenuation detector including filter means selectively passing said commutation frequency $f_c$ and another read-out circuit in the output of said filter means connected to said gating-pulse generator.

9. A system as defined in claim 8 wherein said receiver includes logarithmic amplitude-compression means in cascade with said demodulating means.

10. A system as defined in claim 6 wherein said amplitude demodulator includes a low-pass filter cutting off said carrier frequencies, further comprising an analog-frequency indicator connected to said receiver upstream of said low-pass filter, said indicator including an additional read-out circuit connected to said gating-pulse generator.

11. A system as defined in claim 10 wherein said indicator includes squaring and pulse-shaping means for deriving from said carrier frequencies a train of constant-width pulses with cadences alternating between $f_R$ and $f_M$, and filter means for converting said train into a sine wave of frequency $f_c$ delivered to said additional read-out circuit.

12. A system as defined in claim 11, further comprising phase-registration means connected to the outputs of both said read-out circuits.

13. A system for measuring the relative phase shift between a selected carrier frequency $f_M$ and a standard carrier frequency $f_R$ on passing through a test object, said carrier frequencies being amplitude-modulated by a common modulating frequency $f_m$ and being alternately transmitted through said test object under the control of a switching signal with a commutation frequency $f_c$, comprising:
- a receiver for said carrier frequencies provided with an amplitude demodulator for detecting a carrier envelope with a frequency component of said modulating frequency $f_m$ undergoing two opposite phase shifts during a switch cycle $1/f_c$;
- a phase discriminator connected to the output of said amplitude demodulator and including conversion means for deriving from said envelope a measuring square wave in phase with said frequency component thereof;
- a phase-locking loop in said phase discriminator including a tunable oscillation generator, wave-shaping means for deriving a reference square wave of frequency $f_m$ from the output of said oscillation generator, and a phase comparator receiving said measuring and reference square waves for producing a control signal proportional to the mean phase difference between said square waves to tune said oscillation generator with stabilization of the phase of said reference square wave at the mean phase of said measuring square wave, said phase comparator comprising a logic network with a first output energized by said measuring square wave in the absence of said reference square wave and with a second output energized by said reference square wave in the absence of said measuring square wave; and
- output means in said phase discriminator for deriving from said phase comparator a voltage proportional to the absolute phase difference between said square waves as a measure of said relative phase shift.

14. A system as defined in claim 13 wherein said output means includes a pulse counter connected to said wave-shaping means for stepping by said reference square wave, said pulse counter generating two timing pulses during respective halves of a switching cycle, gating means connected to said logic network for passing a first phasing pulse of one polarity for every energization of said first output in the presence of one of said timing pulses and for passing a second phasing pulse of opposite polarity for every energization of said second output in the presence of the other of said timing pulses, and integrating means for converting said phasing pulses into a sinusoidal oscillation of frequency $f_c$, the width of said phasing pulses and consequently the amplitude of said sinusoidal oscillation being proportional to the phase difference between said square waves.

15. A system as defined in claim 14 wherein said standard carrier frequency $f_R$ is additionally modulated with a characteristic frequency $f_r \gg f_m$ in a predetermined period of its modulation by said frequency $f_m$, further comprising synchronizing means connected in parallel with said phase discriminator to the output of said demodulating means, said synchronizing means including a recovery circuit for said characteristic frequency $f_r$ and a logic circuit in the output of said recovery circuit for deriving one resetting pulse per switching cycle from said characteristic frequency, said pulse counter being connected to said logic circuit for receiving said resetting pulse therefrom.

16. A system as defined in claim 15 wherein said synchronizing means further comprises a band-stop filter upstream of said recovery circuit for eliminating said modulating frequency $f_m$, said recovery circuit including a band-pass filter transmitting said frequency $f_r$ and harmonics-suppressor means upstream of said band-pass filter for blocking harmonics of said commutation frequency $f_c$ in the pass band of said band-pass filter.

17. A system as defined in claim 16 wherein said harmonics-suppressor means comprises a differentiation circuit in the output of said band-stop filter, a saturable amplifier overdriven by the output of said differentiation circuit at the instants of switchover between said carrier frequencies, and a clipping circuit between said amplifier and said band-stop filter, said characteristic frequency $f_r$ having a wave shape sufficiently unaffected by said differentiation circuit to clear said clipping circuit.

18. A system as defined in claim 15 wherein said logic circuit comprises a source of counting pulses with a repetition frequency substantially higher than said characteristic frequency $f_r$, counting means for said counting pulses, and bistable means settable upon attainment of a predetermined count by said counting means in response to the arrival of said characteristic frequency and resettable by an immediately following counting pulse.

19. A system as defined in claim 15 wherein said amplitude demodulator includes a low-pass filter cutting off said carrier frequencies, further comprising a digital frequency discriminator connected to said receiver upstream of said low-pass filter, said frequency discriminator including time-base means responsive to said resetting pulse for measuring two identical time intervals during respective halves of a switching cycle, a first and a second gating circuit alternately unblocked during said time interval for respectively passing a succession of cycles of said carrier frequencies $f_M$ and $f_R$, first and second counting means for the cycles of the carrier frequencies so passed, and storage means for the counts of the passed carrier cycles.

20. A system as defined in claim 19 wherein said time-base means comprises a chain of binary frequency-divider stages, a source of stepping pulses for said divider stages, a pair of flip-flops, and logic means connecting certain of said divider stages to said flip-flops for periodically changing their state of conductivity.

21. A system as defined in claim 14 wherein said output means further includes voltage-responsive oscillator means controlled by the amplitude of said sinusoidal oscillation to generate an output frequency varying with said phase difference.

22. A system as defined in claim 13 wherein said conversion means comprises a zero-crossing detector.

* * * * *